United States Patent [19]
Shin

[11] Patent Number: 5,572,332
[45] Date of Patent: Nov. 5, 1996

[54] VIDEO CASSETTE RECORDER FOR SIMULTANEOUSLY RECORDING BROADCASTING SIGNALS OF TWO CHANNELS AND SELECTIVELY PLAYING BACK THE RECORDED TWO CHANNEL BROADCASTING SIGNALS

[75] Inventor: Joong I. Shin, Kyungki-do, Rep. of Korea

[73] Assignee: Goldstar Co., Ltd., Seoul, Rep. of Korea

[21] Appl. No.: 237,917

[22] Filed: May 4, 1994

Related U.S. Application Data

[63] Continuation of Ser. No. 980,213, Nov. 23, 1992, abandoned.

[30] Foreign Application Priority Data

Nov. 26, 1991 [KR] Rep. of Korea ............... 21316/1991

[51] Int. Cl.⁶ ........................... H04N 5/91; H04N 5/76; H04N 5/94; G11B 5/02
[52] U.S. Cl. ............................... 386/96; 386/50
[58] Field of Search ........................ 358/341, 343, 358/328, 329, 340, 335, 314, 336; 360/19.1; 348/480, 533, 535, 607, 606

[56] References Cited

U.S. PATENT DOCUMENTS

| | | | |
|---|---|---|---|
| 4,630,119 | 12/1986 | Okuno | 358/198 |
| 4,809,085 | 2/1989 | Funahashi | 358/329 |
| 4,907,082 | 2/1990 | Richards | 358/143 |
| 5,005,081 | 4/1991 | Asano | 358/167 |
| 5,034,823 | 7/1991 | Geerlings | 358/314 |
| 5,063,452 | 11/1991 | Higurashi | 360/19.1 |
| 5,148,290 | 9/1992 | Yamaguchi et al. | 358/314 |
| 5,179,453 | 1/1993 | Tozaki | 358/336 |
| 5,187,589 | 2/1993 | Kono et al. | 358/335 |
| 5,191,437 | 3/1993 | Kim | 358/337 |
| 5,394,275 | 2/1995 | Iketani et al. | 360/35.1 |

*Primary Examiner*—Thai Q. Tran
*Assistant Examiner*—Robert Chevalier

[57] ABSTRACT

Recording and playback systems for a VCR. The VCR recording system comprises first and second signal input circuits for inputting first and second channel signals and detecting video and audio signals from the first and second channel signals, respectively, a video signal processing circuit for inputting, in turn, the video signals from the input circuits in the unit of one field per one frame and processing the inputted video signals to be recordable, an audio signal processing circuit, and a recording mechanism for recording the first and second channel audio and video signals on a VCR tape, respectively. The VCR playback system comprises a playback mechanism for playing back first and second channel video signals recorded, in turn, in the unit of one field per one frame, on a VCR tape and for playing back first and second channel audio signals recorded, respectively, on the VCR tape, respectively, a video signal processing circuit for processing one of the video signals of the first and second channels from the playback mechanism to be displayable, an audio signal processing circuit, a video signal correcting circuit for correcting the video signal from the video processing circuit to compensate for a portion of the video signal omitted in the unit of one field per one frame.

28 Claims, 17 Drawing Sheets

F I G. 6d
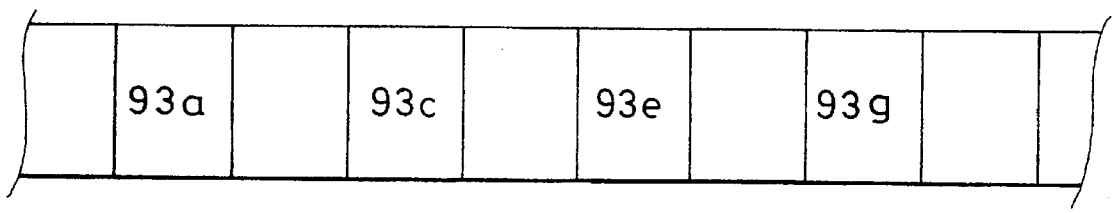
F I G. 6e
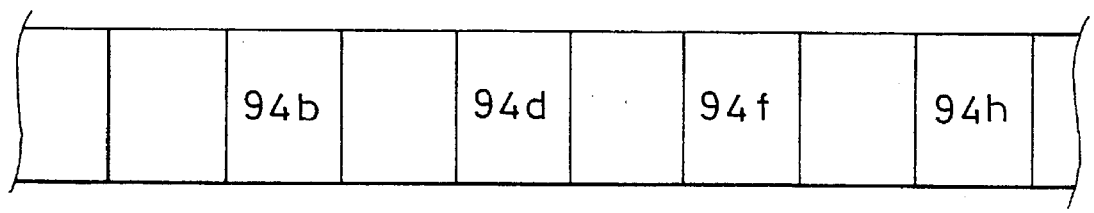
F I G. 6f
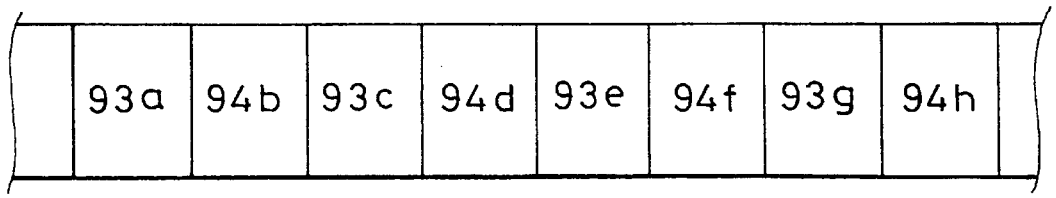

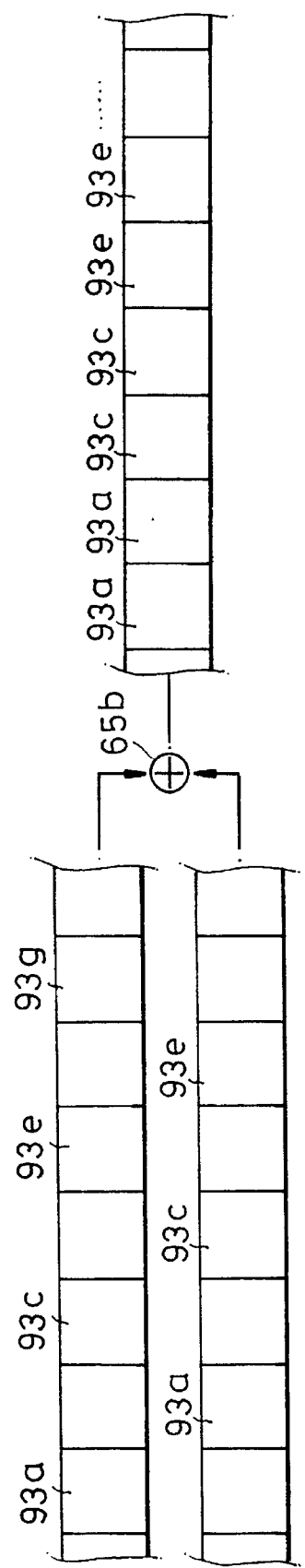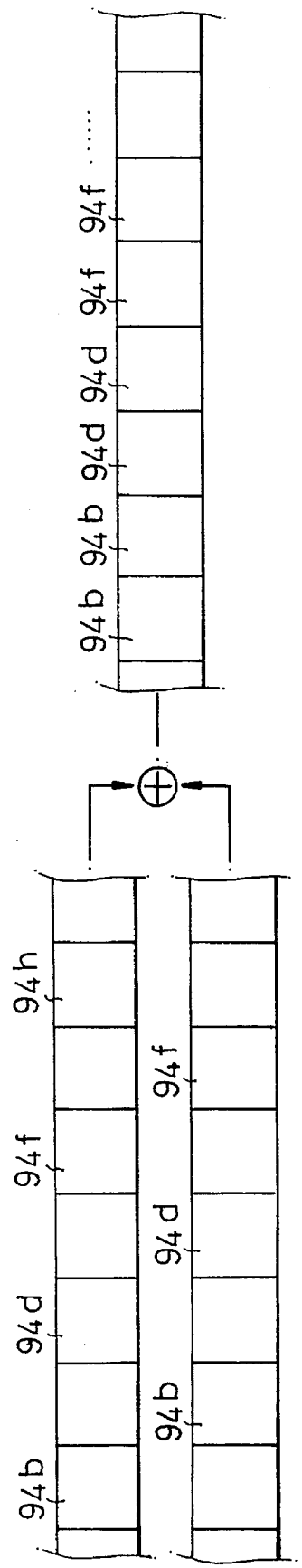

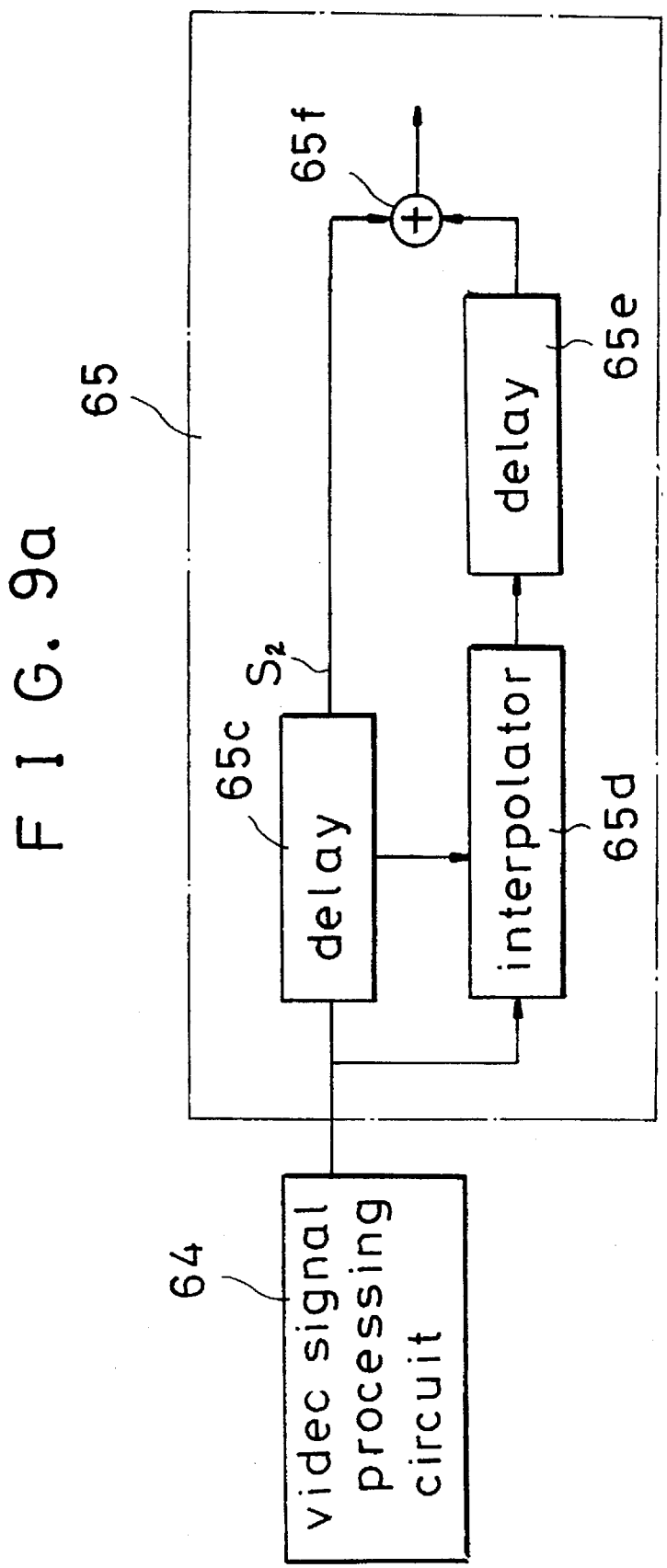

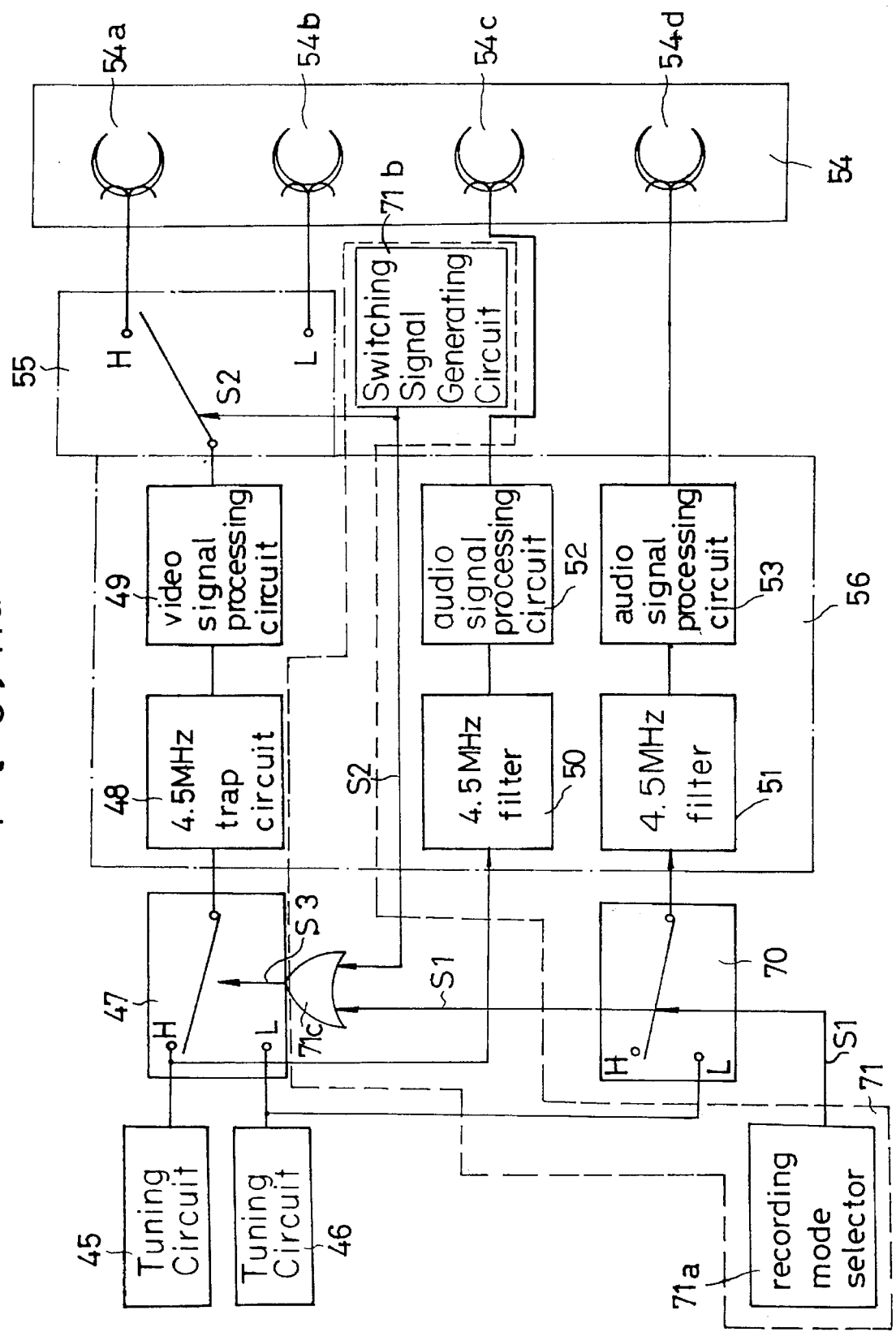

F I G. 11b

|  | S1 | S2 | S3 |
|---|---|---|---|
| single mode | 1 | 1 | 1 |
|  | 1 | ∅ | 1 |
| double mode | ∅ | 1 | 1 |
|  | ∅ | ∅ | ∅ |

F I G. 12b

|  | S4 | S5 | S6 | S7 | S8 |
|---|---|---|---|---|---|
| single mode | 1 | × | 1 | 1 | 1 |
|  | 1 | × | ∅ | ∅ | 1 |
| double mode | ∅ | 1 | × | 1 | 1 |
|  | ∅ | ∅ | × | ∅ | ∅ |

VIDEO CASSETTE RECORDER FOR SIMULTANEOUSLY RECORDING BROADCASTING SIGNALS OF TWO CHANNELS AND SELECTIVELY PLAYING BACK THE RECORDED TWO CHANNEL BROADCASTING SIGNALS

BACKGROUND OF THE INVENTION

This application is a continuation of application Ser. No. 07/980,213 filed on Nov. 23, 1992, now abandoned.

FIELD OF THE INVENTION

The present invention relates in general to a video cassette recorder (VCR), and more particularly to a VCR for simultaneously recording broadcasting signals of two channels and selectively playing back the recorded two channel broadcasting signals.

DESCRIPTION OF THE PRIOR ART

A VCR generally comprises recording and playback systems. As a construction of the recording system is varied, a construction of the playback system is varied, too. Referring to FIG. 1, there is shown a block diagram of a conventional VCR comprising recording and playback systems. As shown in this figure, first upon receiving broadcasting signals through an antenna 1, a tuner 2 tunes one of the broadcasting signals corresponding to one channel according to a user's selection. The broadcasting signal tuned by the tuner 2 is restored into original video and audio signals, respectively, through a video signal processing circuit including chrominance signal and luminance signal processors 3 and 4 and an audio signal processing circuit 5. The restored video and audio signals are applied to a video head 6 and an audio head 7, respectively. At this time, the video and audio signals are recorded on their allotted areas of a VCR tape 8 by the video head 6 and the audio head 7.

In a playback operation, the video and audio signals recorded on the VCR tape 8 are detected by the video and audio heads 6 and 7 and the detected video and audio signals are converted into radio frequency signals through a radio frequency (RF) converter 9 or applied through a video input terminal V and an audio input terminal A to a television receiver 12, respectively.

Herein, the reference numeral 10, designates a motor driver, 11 a servo system, 13 a counter block, 14 other mechanisms of the VCR, and VP a vertical synchronizing signal input terminal, respectively.

The construction of the conventional VCR is well-known and a detailed description thereof will thus be omitted.

However, the conventional VCR with the above-mentioned construction has a disadvantage, in that it cannot simultaneously record and play back the broadcasting signals of two channels. Namely, since the conventional VCR selects the broadcasting signal of a desired channel through the tuner and records the selected broadcasting signal, it cannot simultaneously record broadcasting signals of two channels although it can record a broadcasting signal of one channel while the broadcasting signal of another channel is watched by the user.

For the purpose of a solution to the above problem, there has been proposed a VCR which is capable of simultaneously recording broadcasting signals of two channels.

Referring to FIG. 2, there is shown a block diagram of a conventional VCR which is capable of simultaneously recording the broadcasting signals of two channels. As shown in this drawing, the conventional VCR comprises two tuners 21 and 22, two signal processing circuits 23 and 24, two recording and playback mechanisms 25 and 26, and a switch 28 for selectively transferring the recorded two channel broadcasting signals to a television receiver or a monitor 27 according to a user's selection. It can be seen from the above construction that the broadcasting signals of two channels are recorded and played back, separately.

However, the conventional VCR with the above construction is nothing but a simple combination of two of the conventional VCRs of FIG. 1 since all the components necessary to the signal reception, processing, recording and etc. are separate. This results in such a high manufacturing cost that a practicality of the VCR is doubtful.

SUMMARY OF THE INVENTION

Therefore, the present invention has been made in view of the above problem, and it is an object of the present invention to provide a VCR for simultaneously recording broadcasting signals of two channels and selectively playing back the recorded broadcasting signals.

In accordance with one aspect of the present invention, there is provided a recording system for a VCR comprising: first signal input means for inputting a first channel signal and detecting video and audio signals from the inputted first channel signal; second signal input means for inputting a second channel signal and detecting video and audio signals from the inputted second channel signal; video signal processing means for inputting, in turn, the video signals from said first and second signal input means in the unit of one field per one frame and processing the inputted video signals to be recordable; audio signal processing means for processing the audio signals from said first and second signal input means to be recordable, respectively; and recording means for recording the audio and video signals of the first and second channels processed to be recordable in said audio and video signal processing means on corresponding tracks of a VCR tape, respectively.

In accordance with another aspect of the present invention, there is provided a playback system for a VCR comprising: playback means for playing back video signals of first and second channels recorded, in turn, in the unit of one field per one frame, on a video track of a VCR tape and for playing back audio signals of the first and second channels recorded, respectively, on audio tracks of the VCR tape, respectively; video signal processing means for processing one of the video signals of the first and second channels outputted from said playback means to be displayable; audio signal processing means for processing one of the audio signals of the first and second channels outputted from said playback means to be audible; video signal correcting means for correcting the video signal from said video processing means to compensate for a portion of the video signal omitted in the unit of one field per one frame; and an output terminal for transferring output signals from said audio signal processing means and said video signal correcting means to a broadcasting medium.

BRIEF DESCRIPTION OF THE DRAWINGS

The above and other objects, features and advantages of the present invention will be more clearly understood from the following detailed description taken in conjunction with the accompanying drawings, in which:

FIGS. 6a to 6f illustrate a process of recording signals video signals of two channels in accordance with the present invention;

FIGS. 8a and 8b illustrate a process of correcting the video signals of the two channels in accordance with the present invention;

FIG. 9a is a block diagram of an alternative embodiment of a video signal correcting circuit in FIG. 5 in accordance with the present invention;

FIG. 11a is a block diagram of an embodiment of a switching signal generating circuit in the recording system in accordance with the present invention;

FIG. 11b is a table illustrating logical values of signals from respective components in the switching signal generating circuit in FIG. 11a;

FIG. 12b is a table illustrating logical values of signals from respective components in the switching signal generating circuit in FIG. 12a.

DETAILED DESCRIPTION OF THE PREFERRED EMBODIMENT

Figure 1:
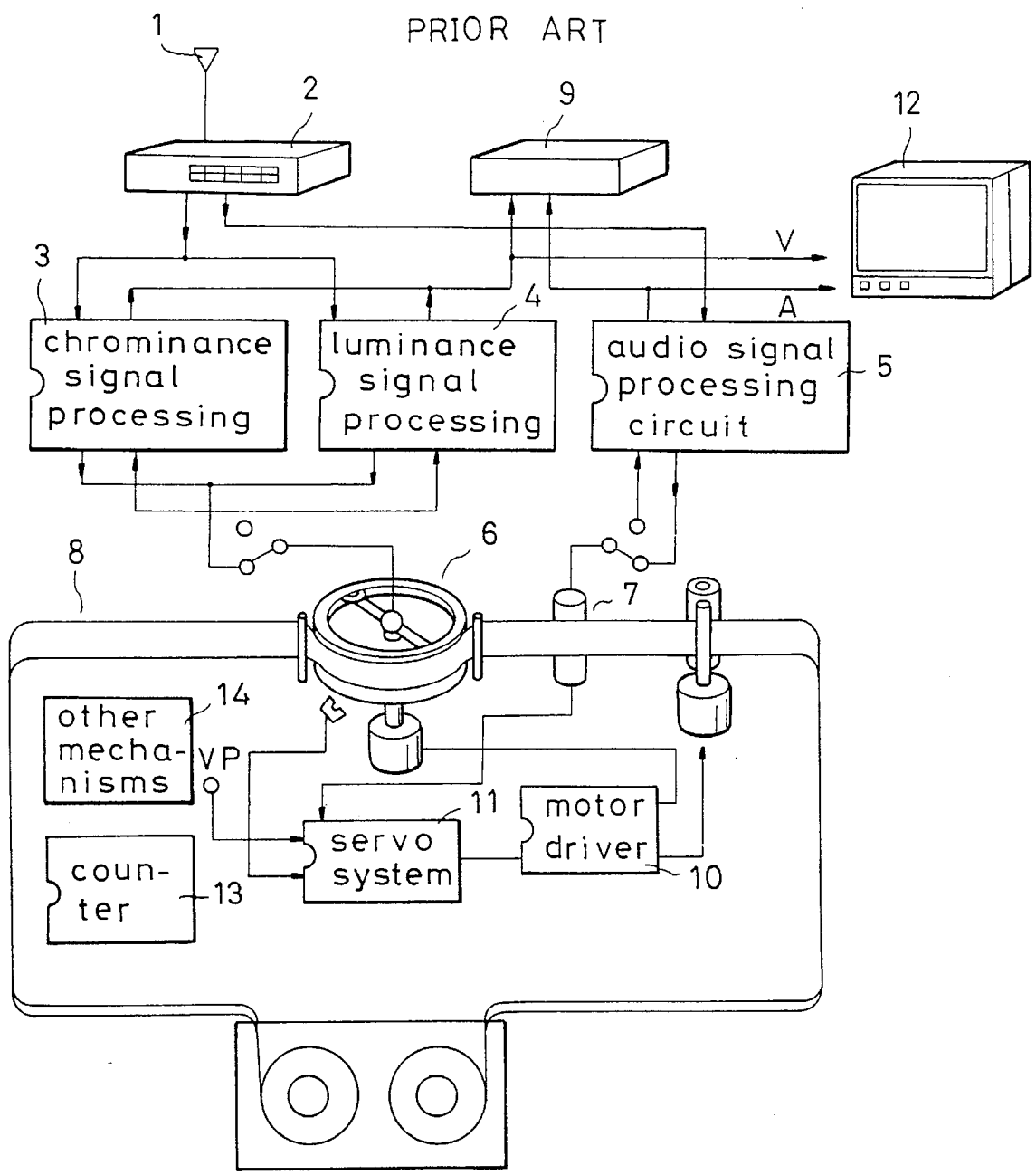
FIG. 1 is a block diagram of a conventional VCR.
Figure 2:
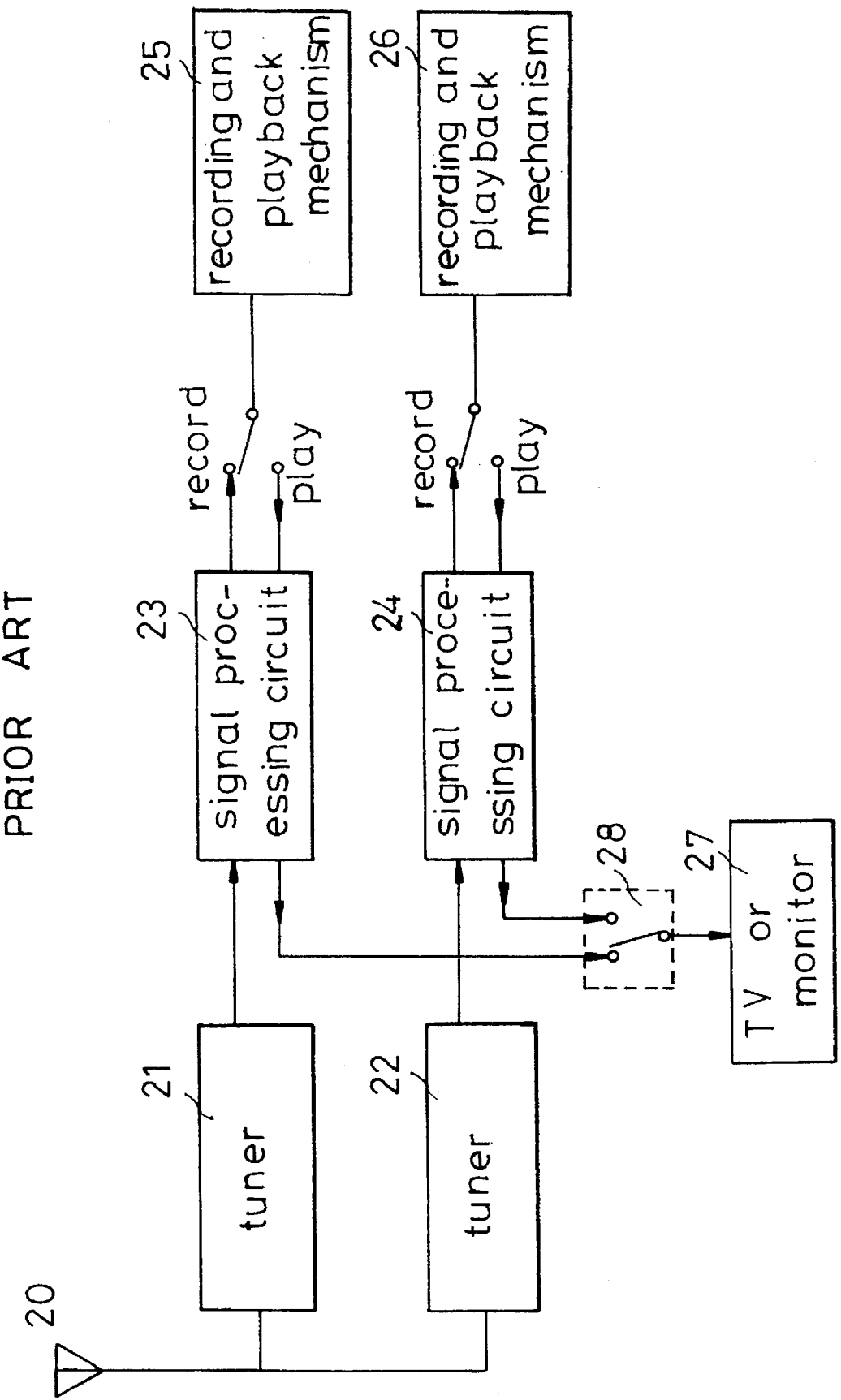
FIG. 2 is a block diagram of a different conventional VCR which is capable of simultaneously recording broadcasting signals of two channels.
Figure 3:
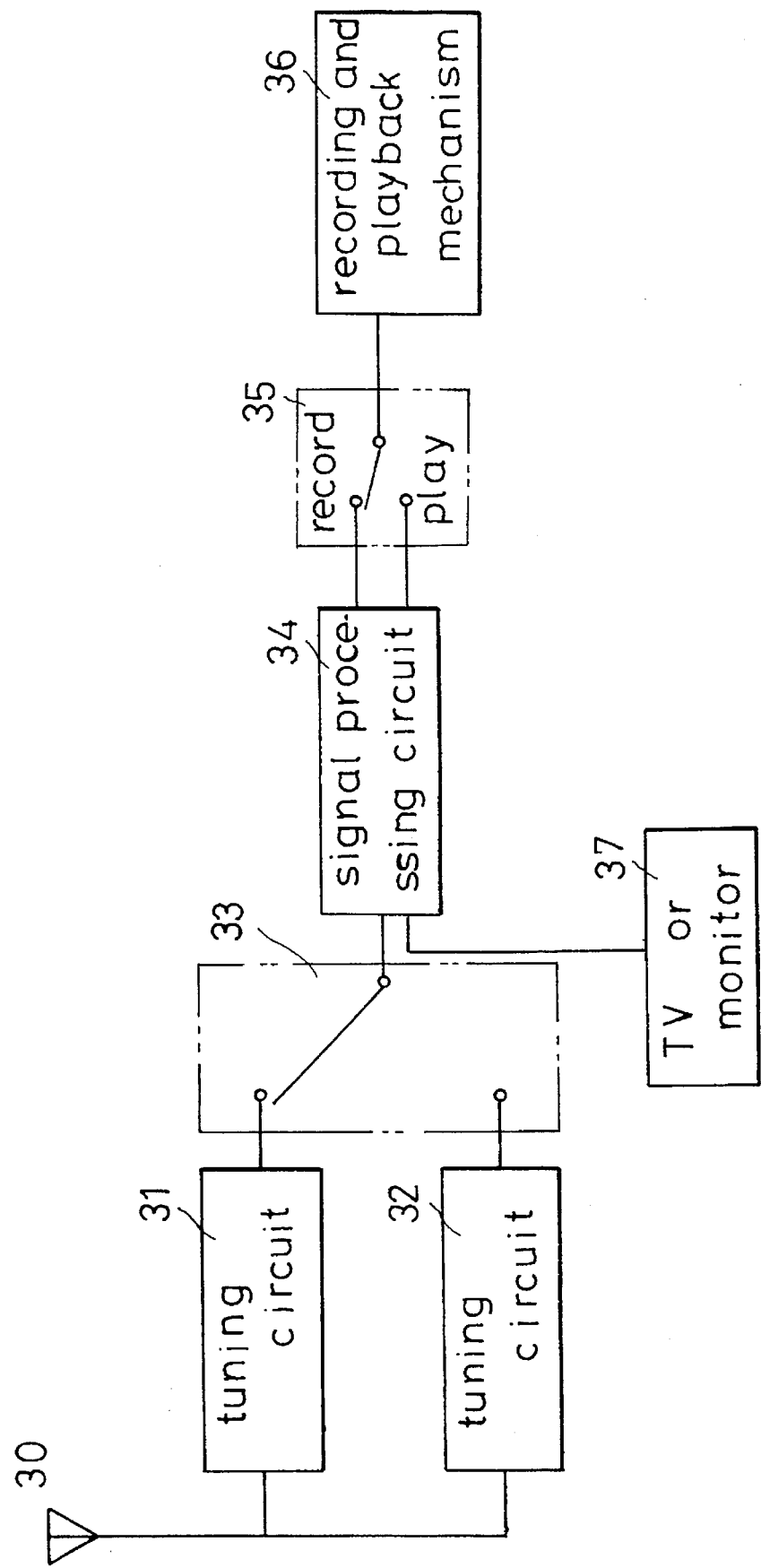
FIG. 3 is a block diagram illustrating the principle of a VCR in accordance with the present invention.

Referring to FIG. 3, there is shown a block diagram illustrating the principle of a VCR in accordance with the present invention. As shown in this drawing, the VCR of the present invention comprises two tuning circuits 31 and 32 connected in common to an antenna 30, a signal processing circuit 34, a switch 33 connected between outputs of the tuning circuits 31 and 32 and an input of the signal processing circuit 34 for selectively transferring output signals from the tuning circuits 31 and 32 in response to an external switching signal, and a switch 35 connected between the signal processing circuit 34 and a recording and playback mechanism 36 for transferring an output signal from the recording and playback mechanism 36 to the signal processing circuit 34 and vice versa in response to an external switching signal. Also, a video signal processed to be displayable in the signal processing circuit 34 is displayed through a television receiver or a monitor 37.

Figure 4:
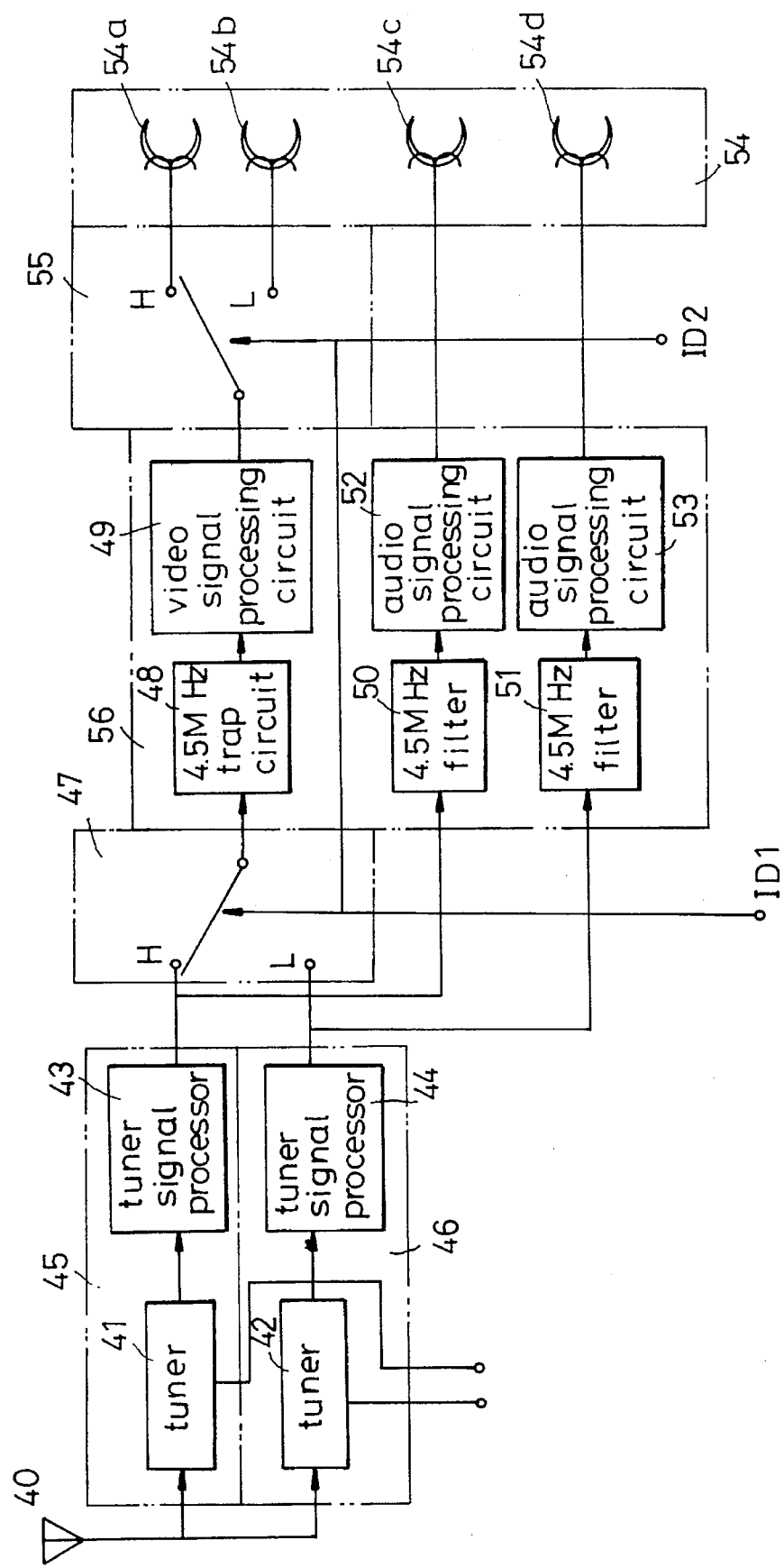
FIG. 4 is a block diagram of an embodiment of a recording system for a VCR in accordance with the present invention.

Referring to FIG. 4, there is shown a block diagram of an embodiment of a recording system for a VCR which is capable of simultaneously recording broadcasting signals of two channels in accordance with the present invention. As shown in this drawing, the VCR recording system of the present invention comprises tuning circuits 45 and 46 including, respectively, tuners 41 and 42 connected in common to an antenna 40 and tuner signal processors 43 and 44 connected respectively to outputs of the tuners 41 and 42 for detecting center frequency signals from broadcasting signals of two selected channels from the tuners 41 and 42. A switch 47 is selectively connected to outputs of the tuner signal processors 43 and 44 in the tuning circuits 45 and 46 for selectively transferring output signals from the tuner signal processors 43 and 44 in response to an external switching signal. A recording signal processing circuit 56 is provided with a 4.5 MHz trap circuit 48 for detecting only a video signal from one of the output signals from the tuner signal processors 43 and 44 through the switch 47, a video signal processing circuit 49 for processing the video signal from the trap circuit 48 to be recordable, 4.5 MHz filters 50 and 51 connected to the outputs of the tuner signal processing circuits 43 and 44 in the tuning circuits 45 and 46 for detecting audio signals from the output signals from the tuner signal processing circuits 43 and 44, respectively, and audio signal processing circuits 52 and 53 for processing the audio signals from the 4.5 MHz filters 50 and 51 to be recordable. Also connected to the switch 47 is a terminal ID1 for inputting the external switching signal. A recording mechanism 54 is provided with first and second video heads 54a and 54b selectively connected to an output of the video signal processing circuit 49 and first and second audio heads 54c and 54d connected respectively to outputs of the audio signal processing circuits 52 and 53. A switch 55 is connected to the output of the video signal processing circuit 49 for transferring the broadcasting signal of the first channel from the video signal processing circuit 49 to the first video head 54a in the recording mechanism 54 and the broadcasting signal of the second channel from the video signal processing circuit 49 to the second video head 54b in the recording mechanism 54 in response to an external switching signal. Also connected to the switch 55 is a terminal ID2 for inputting the external switching signal. Although not shown, a switching signal generating circuit is provided to apply the switching signals to the switches 47 and 55, respectively, and a detailed description thereof will be mentioned later.

Figure 5:
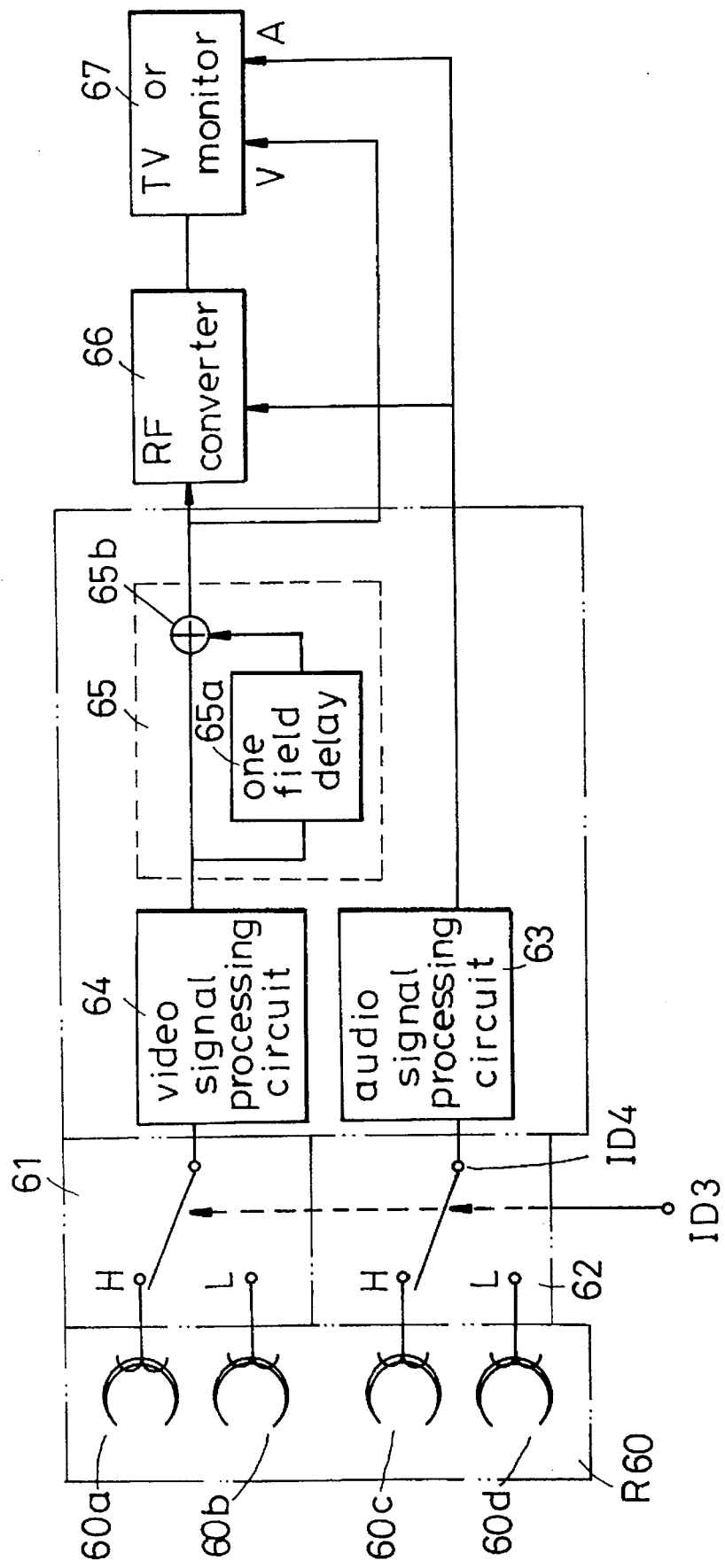
FIG. 5 is a block diagram of an embodiment of a playback system for a VCR in accordance with the present invention.

Referring to FIG. 5, there is shown a block diagram of an embodiment of a playback system for a VCR which is capable of selectively playing back broadcasting signals of two channels simultaneously recorded in accordance with the present invention. As shown in the drawing, the VCR playback system of the present invention comprises a playback mechanism 60 including first and second video heads 60a and 60b and first and second audio heads 60c and 60d. A switch 61 is selectively connected to outputs of the video heads 60a and 60b in the playback mechanism 60 for selectively transferring video signals from the video heads 60a and 60b in response to an external switching signal. A switch 62 is selectively connected to outputs of the audio heads 60c and 60d in the playback mechanism 60 for selectively transferring audio signals from the audio heads 60c and 60d in response to an external switching signal. An audio signal processing circuit 63 is provided to process one of the audio signals from the audio heads 60c and 60d in the playback mechanism 60 through the switch 62 to be audible. A video signal processing circuit 64 is provided to process one of the video signals from the video heads 60a and 60b through the switch 61 to be displayable. An output of the video signal processing circuit 64 is connected to a video input of a RF converter 66 and a video input V of a television receiver 67 through a video signal compensating circuit 65. An output of the audio signal processing circuit 63 is connected directly to an audio input of the RF converter 66 and an audio input A of the television receiver 67. Also connected to the switches 61 and 62 are terminals ID3 and ID4 for inputting the external switching signals.

The video signal compensating circuit 65 connected to the output of the video signal processing circuit 64 includes a one field delay 65a for delaying an output signal from the video signal processing circuit 64 by one field, and an adder 65b for adding an output signal from the one field delay 65a to the output signal from the video signal processing circuit 64.

In an alternative embodiment of the video signal compensating circuit 65 in FIG. 5 as shown in FIG. 9a, the video signal compensating circuit 65 may include a delay 65c for delaying the output signal from the video signal processing circuit 64 by one horizontal interval, an interpolator 65d for interpolating an output signal from the delay 65c into the output signal from the video signal processing circuit 64, a delay 65e for delaying an output signal from the interpolator 65d by one field, and an adder 65f for adding the output signal from the delay 65c to an output signal from the delay 65e.

Although not shown in FIG. 5, a switching signal generating circuit is provided to apply the switching signals to the switches 61 and 62, respectively, and a detailed description thereof will be mentioned later.

Figure 9B:
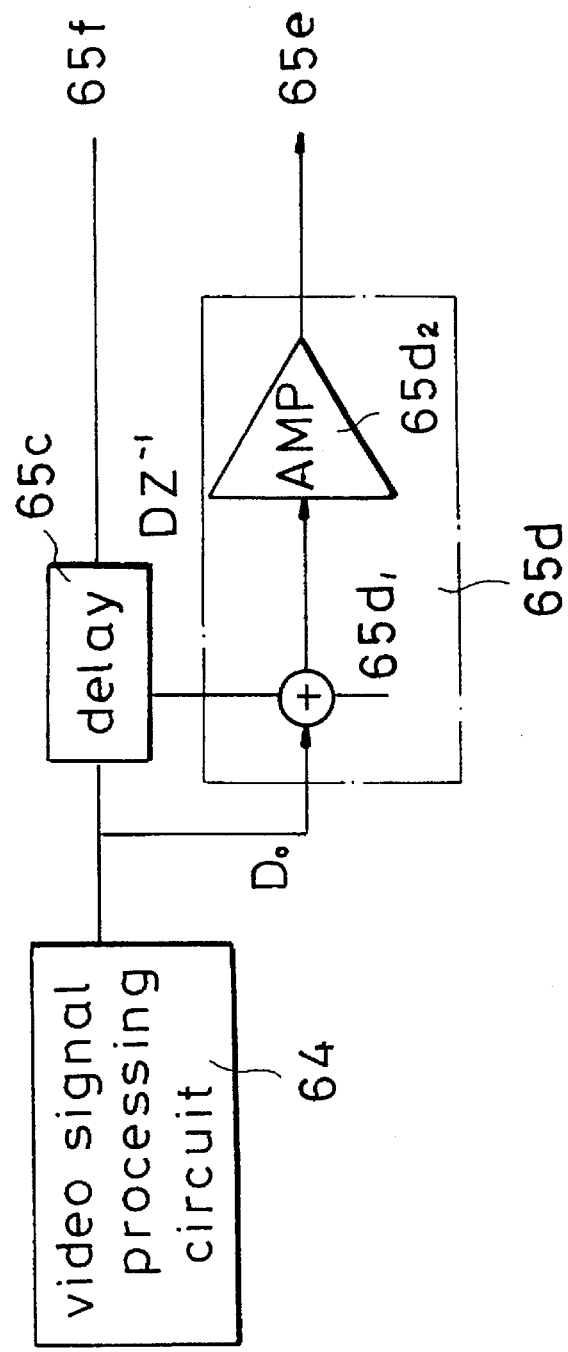
FIG. 9b is a block diagram of an embodiment of an interpolator in FIG. 9a in accordance with the present invention.

On the other hand, the interpolator 65d in FIG. 9a is constructed as shown in FIG. 9b, which is a block diagram of an embodiment of the interpolator 65d in FIG. 9a in accordance with the present invention. Namely, the interpolator 65d is provided with an adder 65d1 for adding the output signal from the delay 65c to the output signal from the video signal processing circuit 64, and an amplifier 65d2 having a gain of ½.

Referring to FIG. 11a, there is shown a block diagram of an embodiment of the switching signal generating circuit for providing the switching signals from the switches 47 and 55 in FIG. 4 in accordance with the present invention. Although not shown in FIG. 4, according to the construction of FIG. 11a, a switch 70 is provided between the output of the tuning circuit 46 and an input of the recording signal processing circuit 56. The switch 70 acts to control the input of the output signal from the tuning circuit 46 to the recording signal processing circuit 56 in response to a switching signal from the switching signal generating circuit 71.

The switching signal generating circuit 71 includes a recording mode selector 71a for outputting a double mode select signal of low level for the simultaneous recording of the broadcasting signals of two s channels or a single mode select signal of a high level for the recording of the broadcasting signal, as a record mode select signal of one channel to the switch 70 in accordance with a user's selection, a pulse generator 71b for generating a pulse signal in the unit of one field and providing the generated pulse signal as the switching signal for the switch 55, and an OR gate 71c for ORing an output signal from the recording mode selector 71a and an output signal from the pulse generator 71b and outputting the ORed signal as the switching signal to the switch 47. The operation of the construction in FIG. 11a will be clearly understood from a detailed description taken later in conjunction with FIG. 11b which is a table illustrating logical values of the signals from the respective components in the switching signal generating circuit 71 of FIG. 11a.

Figure 12A:
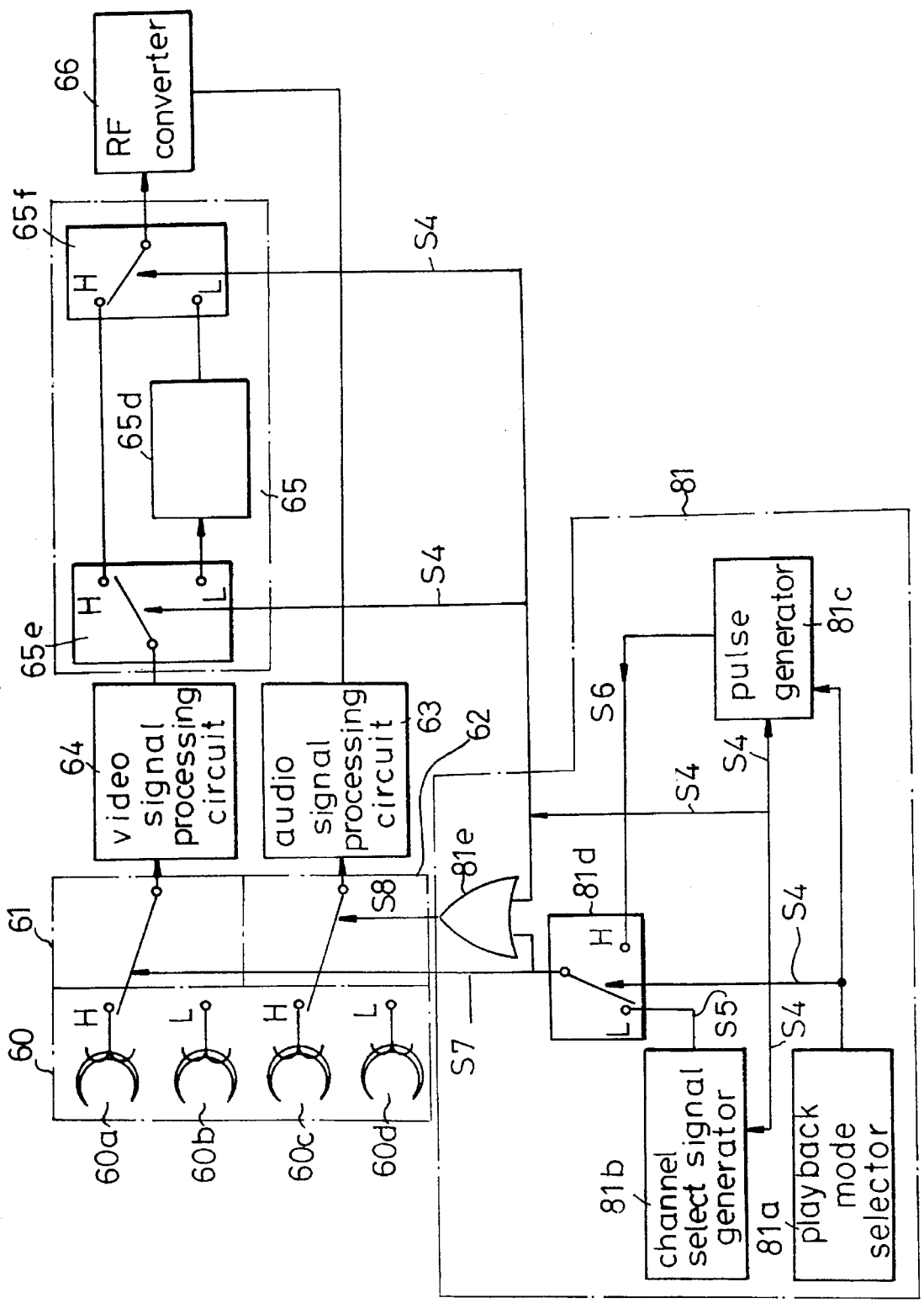
FIG. 12a is a block diagram of an embodiment of a switching signal generating circuit in the playback system in accordance with the present invention.

Referring to FIG. 12a, there is shown a block diagram of an embodiment of the switching signal generating circuit for providing the switching signals for the switches 61 and 62 in FIG. 5 in accordance with the present invention. In this drawing, there is further shown a different embodiment of the video signal compensating circuit 65 illustrated in FIG. 5. As shown in FIG. 12a, the video signal compensating circuit 65 includes a switch 65e for inputting the output signal from the video signal processing circuit 64 to be displayable and outputting the inputted signal through its first output terminal H or its second output terminal L in response to a switching signal from the switching signal generating circuit 81, an interpolator 65d for compensating for an omitted portion of the video signal outputted through the second output terminal L of the switch 65h, and a switch 65f for inputting the video signal outputted through the first output terminal H of the switch 65h at its first input terminal H and an output signal from the interpolator 65d at its second input terminal L and selectively outputting the inputted signals in response to a switching signal from the switching signal generating circuit 81.

The switching signal generating circuit 81 includes a playback mode selector 81a for outputting a double mode select signal of low level for the playback of the broadcasting signal of one of the two channels according to a user's selection if two channel broadcasting signals have been recorded simultaneously on the VCR tape and a single mode select signal of high level for the playback of the one channel broadcasting signal according to a user's selection if the one channel broadcasting signal has been recorded on the VCR tape, a channel select signal generator 81b being enabled in response to the double mode select signal (logical value "0") from the playback mode selector 81a for generating logical value "1" or "0" as a channel select signal according to a user's playback channel selection, a pulse generator 81c being enabled in response to the single mode select signal (logical value "1") from the playback mode selector 81a for generating a pulse signal in the unit of one field, a switch 81d for inputting the output signals from the channel select signal generator 81b and the pulse generator 81c and outputting one of the inputted signals as the switching signal to the switch 61 (in response to the output signal from the playback mode selector 81a as a switching signal thereto), and to an OR gate 81e. The OR gate 81e ORs the output signal from the switch 81d and the signal from channel select signal generator 81b. The output signal from the playback mode selector 81a is applied as the switching signals to switches 65e and 65f in the video signal compensating circuit 65 in FIG. 12a. The operation of the construction in FIG. 12a will be clearly understood from a detailed description taken later on conjunction with FIG. 12b which is a table illustrating logical values of the signals from the respective components in the switching signal generating circuit 81 of FIG. 12a.

Now, the operation of the VCR with the above-mentioned construction in accordance with the present invention will be described in detail.

The process of simultaneously recording the broadcasting signals of the two channels will be described first.

In FIG. 4, the broadcasting signals of the two channels required by the user are tuned in the tuners 41 and 42 in the tuning circuits 45 and 46. The tuner signal processors 43 and 44 in the tuning circuits 45 and 46 detect the video and audio signals of the center frequencies from the tuned broadcasting signals, respectively. The detected two channel video signals are applied to the 4.5 MHz trap circuit 48 in the recording signal processing circuit 56 through the switch 47. At this time, the detected two channel video signals are, in turn, applied to the 4.5 MHz trap circuit 48 in the unit of one field in response to the switching signal from the switching signal generating circuit 71 in FIG. 11a. The two channel video signals from the 4.5 MHz trap circuit 48 is processed to be recordable in the video signal processing circuit 49, which applies the processed video signals to the recording mechanism 54 through the switch 55. In the recording mechanism 54, the video signals through the switch 55 are, in turn, recorded on the VCR tape through the video heads 54a and 54b in the unit of one field per one frame. On the other hand, upon receiving the video and audio signals through the switch 47, the 4.5 MHz trap circuit 48 removes the received audio signal and, thus, outputs only the video signal to the video signal processing circuit 49, which processes the inputted video signal to be recordable.

The two channel video and audio signals from the tuning circuits 45 and 46 are also applied to the 4.5 MHz filters 50 and 51 in the recording signal processing circuit 56, which remove the received video signals and, thus, output only the two channel audio signals to the audio signal processing circuits 52 and 53, which process the two audio signals to be recordable. In the recording mechanism 54, the audio signals from the audio signal processing circuits 52 and 53 are recorded on two audio tracks of the VCR tape through the audio heads 54c and 54d, respectively.

Namely, the video signal of the one channel is recorded on the VCR tape in the unit of one field per one frame by the video head 54a, while the video signal of the other channel is recorded on the VCR tape in the unit of one field per one frame by the video head 54b, and the audio signals of the two channels are recorded on the two audio tracks of the VCR tape by the dedicated audio heads 54c and 54d, respectively.

Figure 7A:
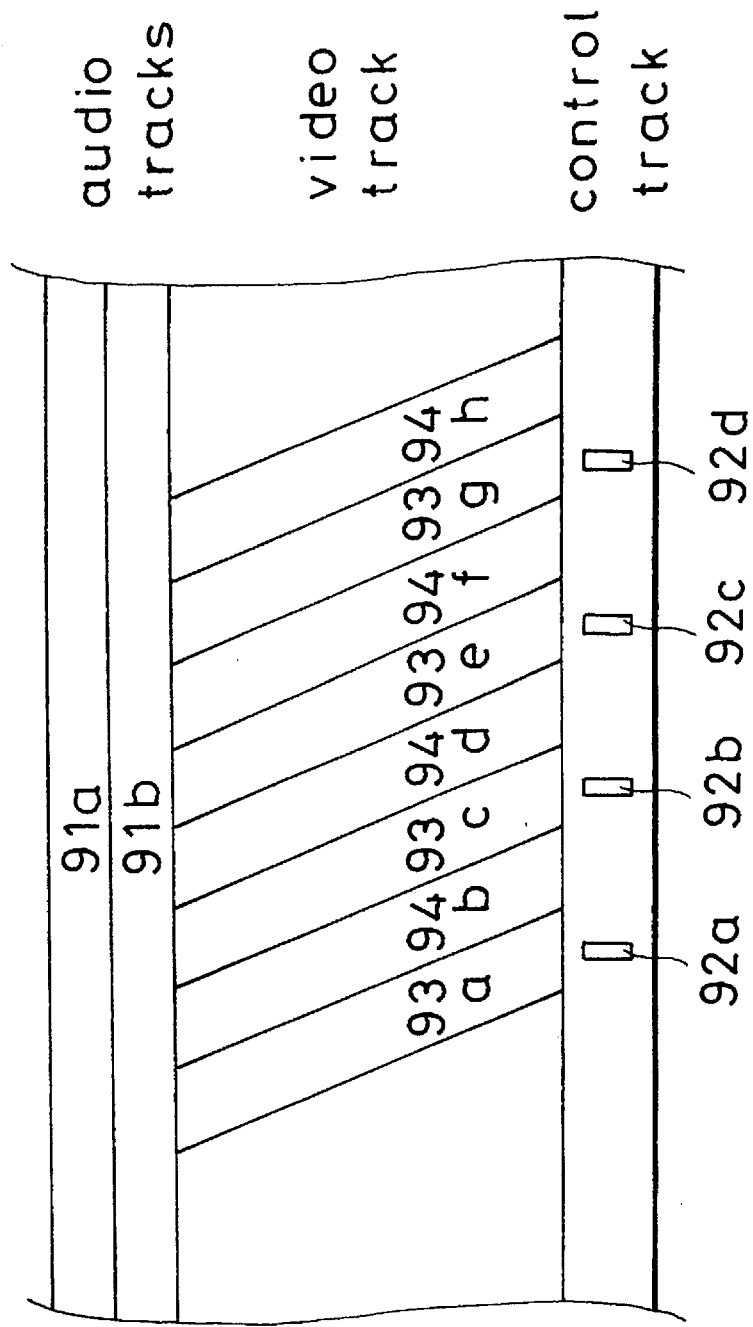
FIG. 7a shows an arrangement of audio and video signals recorded on a VCR tape in accordance with the present invention.

Referring to FIG. 7a, there is shown an arrangement of the audio and video signals recorded on the VCR tape in accordance with the present invention. As shown in this drawing, the video signals of the two channels are recorded on a video track of the VCR tape and the audio signals of the two channels are recorded on the two audio tracks thereof, respectively. The video signals of the two channels are, in turn, recorded on the video track of the VCR tape in the unit of one field per one frame by the switch 55 in FIG. 4. As a result, the video signal of the first channel is recorded on fields 93a, 93c, . . . 93g of the video track and the video signal of the second channel is recorded on fields 94b, 94d, . . . 94h of the video track, in a one field alternate manner. Also, a control signal is recorded on frames 92a–92n of a control track in the unit of frame. The audio signals of the first and second channels are recorded on the audio tracks 91a and 91b, respectively.

Figure 6A:
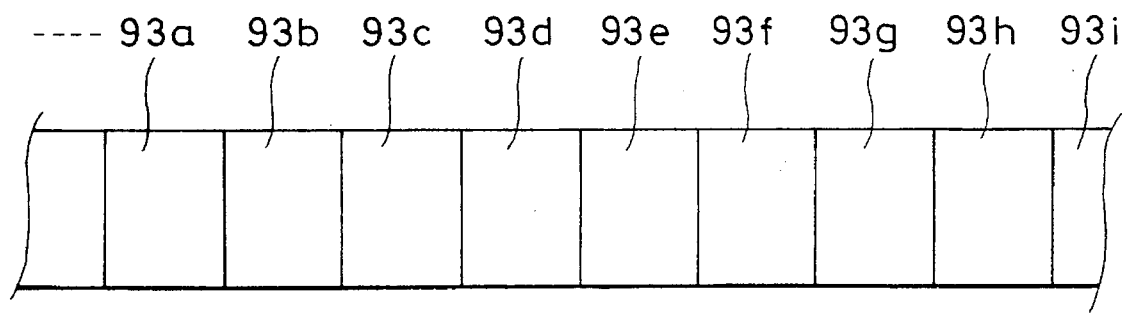
Figure 6B:
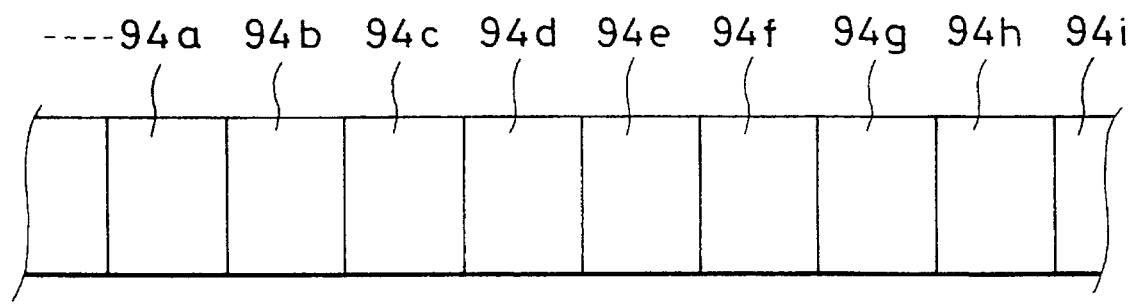
Figure 6C:
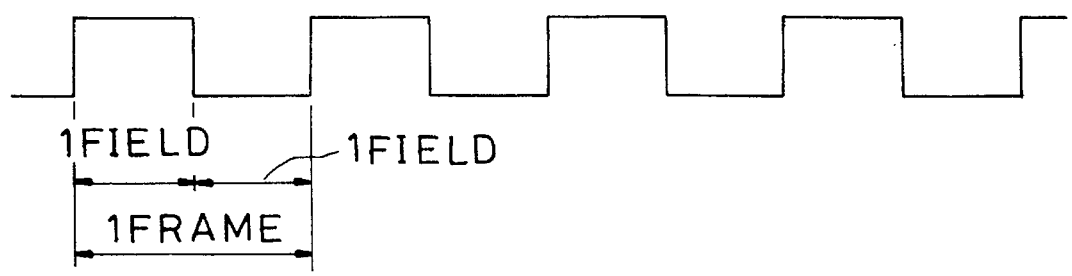

In other words, referring to FIGS. 6a to 6e which illustrate the process of recording the two channel video signals in accordance with the present invention, the video signal outputted from the tuning circuit 45 as shown in FIG. 6a and the video signal outputted from the tuning circuit 46 as shown in FIG. 6b are, in turn, recorded on the video track of the VCR tape in the unit of one field in response to the switching signal being applied to the switch 47 as shown in FIG. 6c. As a result, the video signal from the tuning circuit 45 is recorded on the first fields 93a, 93c, . . . 93g of the respective frames of the video track of the VCR tape as shown in FIG. 6d and the video signal from the tuning circuit 46 is recorded on the second fields 94b, 94d, . . . 94h of the respective frames of the VCR tape as shown in FIG. 6e. FIG. 6f illustrates an arrangement of the video signals from the tuning circuits 45 and 46 recorded on the video track of the VCR tape.

Figure 7B:
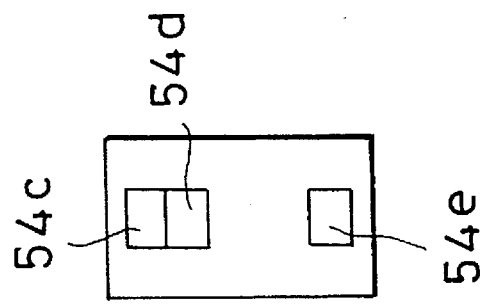
FIG. 7b shows an arrangement of audio heads and a control head.

FIG. 7b illustrates an arrangement of the audio heads 54c and 54d in FIG. 4 and a control head 54e for the purpose of a better understanding of the present invention. As shown in this figure, the two audio heads 54c and 54d are disposed integrally with each other.

The process of recording the audio signals will hereinafter be described.

The audio signals of the two channels through the tuners 41 and 42 and the tuner signal processors 43 and 44 in the tuning circuits 45 and 46 are applied to the 4.5 MHz filters 50 and 51 in the recording signal processing circuit 56, which remove the received video components and, thus, output only the two channel audio signals to the audio signal processing circuits 52 and 53, which process the two audio signals to be recordable. In the recording mechanism 54, the audio signals from the audio signal processing circuits 52 and 53 are recorded on the two audio tracks of the VCR tape through the dedicated audio heads 54c and 54d, respectively. Namely, the audio signal from the tuning circuit 45 is recorded on the audio track 91a of the VCR tape through the audio head 54c and the audio signal from the tuning circuit 46 is recorded on the audio track 91b of the VCR tape through the audio head 54d. Therefore, the video and audio signals of the two channels can be recorded simultaneously by the switches, with a format of the broadcasting signal in the conventional VCR being used as it is.

The process of playing back the two channel broadcasting signals recorded on the VCR tape will hereinafter be described.

The two video signals through the video heads 60a and 60b and the two audio signals through the audio heads 60c and 60d are selectively outputted to the video signal processing circuit 64 and the audio signal processing circuit 63 through the switches 61 and 62 in response to the switching signals from the switching signal generating circuit 81 in FIG. 12a, respectively.

Upon receiving the audio and video signals through the switches 62 and 61, the audio signal processing circuit 63 and the video signal processing circuit 64 process the received audio and video signals to be playable-back and outputs the processed audio and video signals to the audio and video input terminals of the RF converter 66 and the audio and video input terminals A and V of the television receiver 67. At this time, the audio signal can be played back as it is recorded on the VCR tape and the video signal cannot be played back as it is recorded on the VCR tape. Namely, since there is present one field of the frame with no video signal portion as shown in FIGS. 6 and 7, the video signal portion on the one field of the same frame may be omitted in the playback operation. This makes the playback of a natural video picture impossible. For this reason, the video signal compensating circuit 65 in FIG. 5 serves to correct the one field omitted video signal portion by restoring the frame to two fields.

That is, in the video signal compensating circuit 65, the video signal through the video head 60a or 60b as shown in FIGS. 6d and 6e is delayed by one field in the one field delay 65a. The output signal from the one field delay 65a is again added to the video signal through the video head 60a or 60b. As a result, the one field omitted video signal portion is compensated for.

Referring to FIGS. 8a and 8b, there are illustrated the process of correcting the video signals of the two channels in accordance with the present invention. The one field omitted portion of the first channel is compensated for as shown in FIG. 8a. As a result, the video signal of the first channel can be restored similarly to the original video signal provided by the tuning circuit 45 in FIG. 4 in the recording operation. In the same manner, the video signal of the second channel can be restored similarly to the original video signal provided by the tuning circuit 46 in FIG. 4 in the recording operation.

However, since the two fields of the frame are of the same video signal portion in correcting the video signal, a resolution of the video picture may be reduced. In this connection, interpolation for the video signal can minimize the reduction in the resolution of the video picture.

The process of correcting the video signals of the two channels through the interpolation in accordance with the present invention will hereinafter be described with reference to FIGS. 9a and 9b as mentioned above and FIGS. 10a to 10f which illustrate the process of correcting the video signals of the two channels through the interpolation in FIG. 9b in accordance with the present invention.

As shown in FIG. 9a, the output signal from the video signal processing circuit 64 is delayed by one horizontal interval H in the delay 65c and the interpolator 65d interpolates the output signal from the delay 65c into the output signal from the video signal processing circuit 64. The delay 65e delays the output signal from the interpolator 65d by one field and the adder 65f adds the output signal from the delay 65c to the output signal from the delay 65e.

Figure 10A:
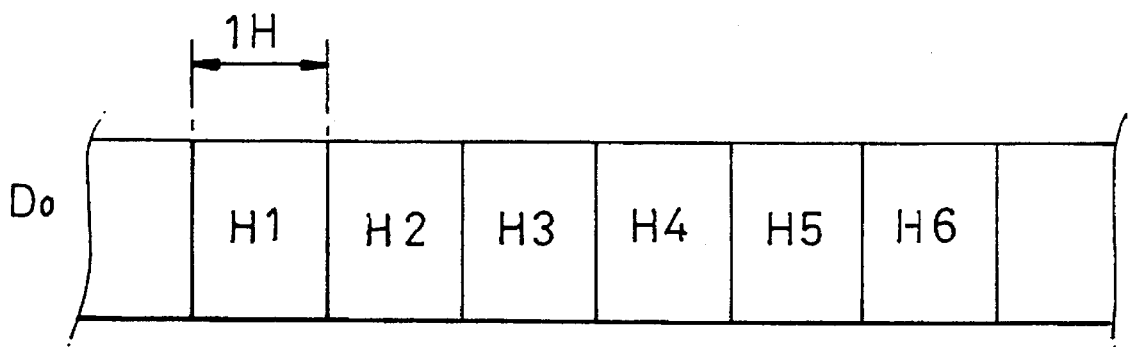
FIGS. 10a to 10f illustrate a process of correcting the video signals of the two channels through the interpolator in FIG. 9b in accordance with the present invention.
Figure 10B:
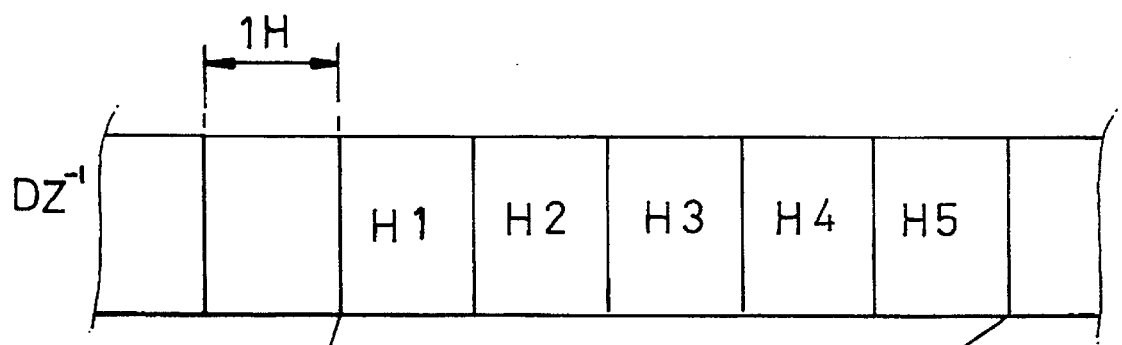
Figure 10C:
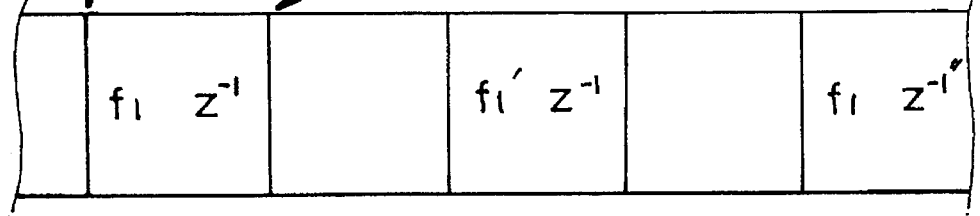
Figure 10D:
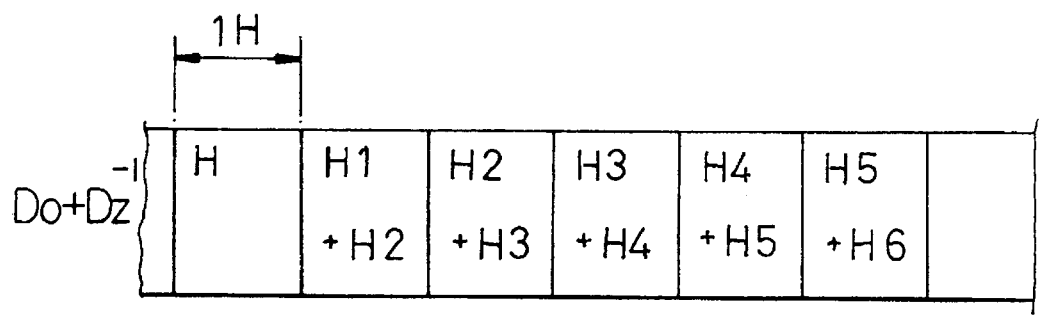
Figure 10E:
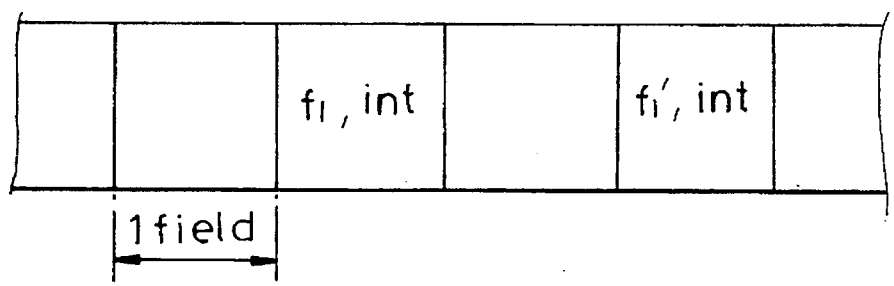
Figure 10F:
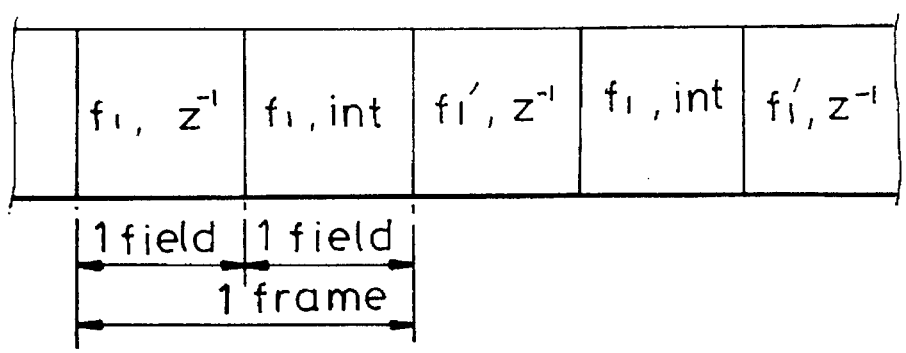

To put the operation of the interpolator 65d concretely, as shown in FIG. 9b, the adder 65d1 adds the one horizontal interval delayed video signal $DZ^{-1}$ to the output signal from the video signal processing circuit 64. The output signal from the adder 65d1 is amplitude-corrected in the amplifier 65d2 having a gain of 0.5 and then applied to the one-field delay 65e. Namely, the output signal from the video signal processing circuit 64 in FIGS. 9a and 9b is as shown in FIG. 10a and the output signal from the one horizontal interval delay 65c is as shown in FIG. 10b. FIG. 10c shows the one horizontal interval delayed video signal $DZ^{-1}$ in the unit of field and FIG. 10d shows the output signal $(DO+DZ^{-1})$ from the adder 65d1. FIG. 10e shows the video signal outputted from the one field delay 65e which delays the output signal from the interpolator 65d (i.e., the output signal from the amplifier 65d2) by one field. FIG. 10f shows the output signal from the adder 65f, the resolution of which are substantially the same as that of the original video signal.

The operation of the switching signal generating circuit 71 for the recording of the broadcasting signals will hereinafter be described with reference to 11a and 11b.

If the user operates the recording mode selector 71a to select the double mode, the recording mode selector 71a outputs the signal S1 of logical "0". Determined as a result of the state of the output signal S1 from the recording mode selector 71a are the states of the signals S2 and S3 (see FIG. 11b). On the contrary, if the single mode is selected, the output signal S1 from the recording mode selector 71a becomes logical "1", thereby allowing the states of the signals S2 and S3 to be determined as shown in FIG. 11b.

Figure 11B:
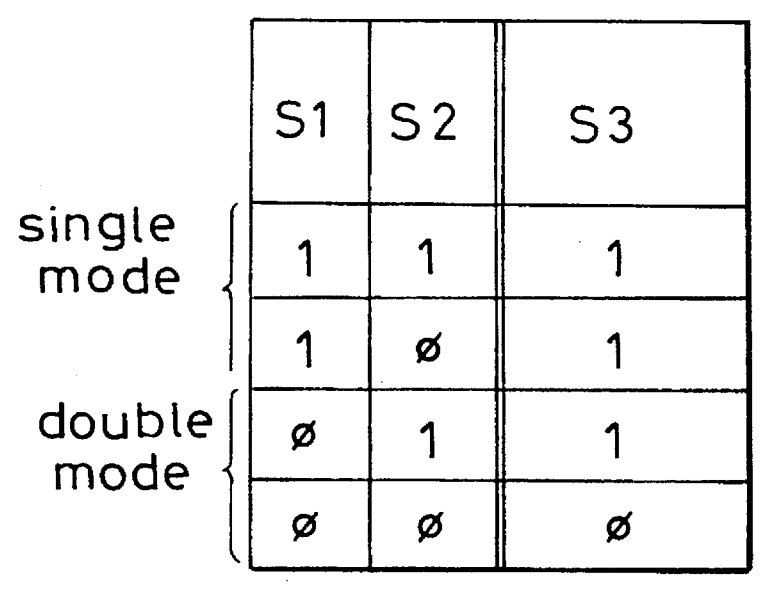

In the single mode, as shown in FIG. 11b, the switching signals of logical "1" are applied to the switches 47 and 70, thereby allowing only the output signal from the tuning circuit 45 to be selected. At this time, the pulse generator 71b outputs the pulses of logical "1" and "0" repeatedly in the unit of one field and the signal S3 is continuously maintained at logical "1".

In the double mode, the recording mode selector 71a outputs the signal S1 of logical "0" as shown in FIG. 11b and the pulse generator 71b outputs, in turn, the pulses of logical "0" and "1" in the unit of one field. As a result, the switches 47 and 55 are switched in the unit of one field in response to the signals S2 and S3. In result, the video signal from the tuning circuit 45 and the video signal from the tuning circuit 46 are recorded on the same VCR tape through the video heads 54a and 54b in the unit of one field per one frame, respectively.

The operation of the switching signal generating circuit 81 for the playback of the recorded broadcasting signals will hereinafter be described with reference to 12a and 12b.

In the single mode, as shown in FIG. 12b, if the signals S4 and S5 of logical "1" and "0" are outputted from the playback mode selector 81a and the channel select signal generator 81b, respectively, the state of the signal S7 is repeated at logical "0" and "1" by the output signal S6 from the pulse generator 81c. As a result, the operation of the switch 61 is the same as that in the conventional VCR and the played-back video signal is applied directly to the RF converter 66, not through the video signal correcting circuit 65. Namely, the same playback operation as that of the conventional VCR is performed.

In the double mode, as shown in FIG. 12b, the playback mode selector 81a outputs the signal S4 of logical "0" and the channel select signal generator 81b outputs the signal S5 of logical "1" or "0" according to a user's channel selection. At this time, the pulse generator 81c is disabled by the signal S4, thereby to generate no signal. As a result, the one field omitted portion of the playback video signal through the corresponding video head is corrected in the interpolator 65d and then applied to the RF converter 66.

As hereinbefore described, according to the present invention, the broadcasting signals of the two channels can be recorded simultaneously and played back selectively by the simple construction of the VCR including simple means such as the switches. Moreover, although the tuners for tuning the television broadcasting signals have been used as signal input means for recording for illustrative purpose, the present invention is not limited thereto and the signal input means may be a playback output terminal of a different signal recording system such as a different VCR or a camcorder.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A recording system for a VCR comprising:

first signal input means for inputting a first channel signal and detecting video and audio signals from the inputted first channel signal;

second signal input means for inputting a second channel signal and detecting video and audio signals from the inputted second channel signal;

video signal processing means for inputting the video signals from said first and second signal input means and processing the inputted video signals to be a first non-interleaved recordable video signal and a second non-interleaved recordable video signal, respectively;

audio signal processing means for processing the audio signals from said first and second signal input means to be a first recordable audio signal and a second recordable audio signal, respectively;

audio recording means, responsive to the audio signal processing means, for recording the first and second recordable audio signals, respectively, onto the VCR tape;

a first video head for recording the first non-interleaved recordable video signal onto a VCR tape;

a second video head for recording the second non-interleaved recordable video signal onto the VCR tape; and a video recording controller, responsive to the video signal processing means, for controlling, for each frame, the first and second video heads to selectively record one of two fields of the first non-interleaved recordable video signal and one of two fields of the second non-interleaved recordable video signal, respectively, to form an interleaved video signal, each frame of the interleaved video signal having a field from each of the first and second non-interleaved recordable video signals, the interleaved video signal being present only as recorded on the VCR tape.

2. A recording system for a VCR, as set forth in claim 1, further comprising:

first switching means for inputting the video signals of the first and second channels from said first and second signal input means and outputting, in turn, the inputted video signals to said video signal processing means in units of one field per one frame or outputting only one of the inputted video signals of the first and second channels to said video processing means in response to a first switching signal;

second switching means for outputting, in turn, the video signals of the first and second channels outputted from said video signal processing means to said recording means in units of one field per one frame or outputting only one of the video signals of the first and second channels from said video signal processing means to said recording means in response to a second switching signal;

third switching means for outputting the audio signal from said second signal input means to said audio signal processing means in response to a third switching signal; and switching signal generating means for providing the switching signals for said first to third switching means, respectively, to allow the audio and video signals of the first and second channels to be recorded simultaneously or allow only one of the audio signals of the first and second channels and only one of the video signals of the first and second channels to be recorded according to a user's selection.

3. A recording system for a VCR, as set forth in claim 1, wherein said first and second signal input means each includes:

a tuner for tuning a broadcasting signal of a corresponding one of the first and second channel signal; and signal processing means for detecting the video and audio signals from the tuned broadcasting signal from said tuner.

4. A recording system for a VCR, as set forth in claim 1, wherein said first and second signal input means each includes:

a playback output terminal of a different signal recording system; and signal processing means for detecting the video and audio signals from a playback signal outputted from said playback output terminal.

5. A recording system for a VCR, as set forth in claim 1, wherein said video signal processing means includes:

a trap circuit for removing the audio signal from the output signal from said first signal input means or the audio signal from the output signal from said second signal input means; and signal processing means for processing an output signal from said trap circuit to be recordable.

6. A recording system for a VCR, as set forth in claim 1, wherein said audio signal processing means includes:

a first filter for passing only the audio signal of an output signal from said first signal input means;

a second filter for passing only the audio signal of an output signal from said second signal input means;

first signal processing means for processing an output signal from said first filter to be recordable; and second signal processing means for processing an output signal from said second filter to be recordable.

7. A recording system for a VCR, as set forth in claim 1, wherein said recording means includes:

a first video head for recording the video signal of the first channel;

a second video head for recording the video signal of the second channel;

a first audio head for recording the audio signal of the first channel; and a second audio head for recording the audio signal of the second channel.

8. A recording system for a VCR comprising:

first signal input means for inputting a first channel signal and detecting video and audio signals from the inputted first channel signal;

second signal input means for inputting a second channel signal and detecting video and audio signals from the inputted second channel signal;

video signal processing means for inputting the video signals from said first and second signal input means and processing the inputted video signals to be a first non-interleaved recordable video signal and a second non-interleaved recordable video signal, respectively;

audio signal processing means for processing the audio signals from said first and second signal input means to be a first recordable audio signal and a second recordable audio signal, respectively;

audio recording means, responsive to the audio signal processing means, for recording the first and second recordable audio signals, respectively, onto the VCR tape;

a first video head for recording the first non-interleaved recordable video signal onto a VCR tape;

a second video head for recording the second non-interleaved recordable video signal onto the VCR tape; and a video recording controller, responsive to the video signal processing means, for controlling, for each frame, the first and second video heads to selectively record one of two fields of the first non-interleaved recordable video signal and one of two fields of the second non-interleaved recordable video signal, respectively, to form an interleaved video signal, each frame of the interleaved video signal having a field from each of the first and second non-interleaved recordable video signals, the interleaved video signal being present only as recorded on the VCR tape; and first switching means for inputting the video signals of the first and second channels from said first and second signal input means and outputting, in turn, the inputted video signals to said video signal processing means in units of one field per one frame or outputting only one of the inputted video signals of the first and second channels to said video processing means in response to a first switching signal;

second switching means for outputting, in turn, the video signals of the first and second channels outputted from said video signal processing means to said recording means in units of one field per one frame or outputting only one of the video signals of the first and second channels from said video signal processing means to said recording means in response to a second switching signal;

third switching means for outputting the audio signal from said second signal input means to said audio signal processing means in response to a third switching signal; and switching signal generating means for providing the switching signals for said first to third switching means, respectively, to allow the audio and video signals of the first and second channels to be recorded simultaneously or allow only one of the audio signals of the first and second channels and only one of the video signals of the first and second channels to be recorded according to a user's selection;

wherein said switching signal generating means includes:
recording mode selecting means for outputting a logic signal of a first level for the simultaneous recording of the two channel signals or a logic signal of a second level for the recording of only one of the two channel signals, as a record mode select signal as the third switching signal to said third switching means in accordance with said user's selection;

logic signal generating means for generating, in turn, logic signals of first and second levels in a unit of one field and providing the generated logic signals as the second switching signal for said second switching means; and ORing means for ORing an output signal from said recording mode selecting means and an output signal from said logic signal generating means and outputting the ORed signal as the first switching signal to said first switching means.

9. A playback system for a VCR comprising:
playback means for playing back video signals of first and second channels recorded, respectively, in a unit of one field per one frame, on a video track of a VCR tape and for playing back audio signals of the first and second channels recorded, respectively, on audio tracks of the VCR tape, respectively;

video signal processing means for processing one of the video signals of the first and second channels outputted from said playback means to be displayable;

audio signal processing means for processing one of the audio signals of the first and second channels outputted from said playback means to be audible; and field compensating means, responsive to a video output signal from said video processing means, for compensating for an omitted field of the video signal.

10. A playback system for a VCR, as set forth in claim 9, further comprising:
radio frequency converting means for converting the output signals from said audio signal processing means and said field compensating means into radio frequency signals to allow the output signals from said audio signal processing means and said field compensating means to be transferred as radio frequency signals to said broadcasting medium.

11. A playback system for a VCR, as set forth in claim 9, further comprising:
an output terminal for transferring output signals from said audio signal processing means and said field compensating means to a broadcasting medium;

wherein said broadcasting medium includes one of a television receiver and a monitor.

12. A playback system for a VCR, as set forth in claim 9, wherein said playback means includes:
a first video head for playing back the video signal of the first channel recorded in units of one field per one frame on the video track of the VCR tape;

a second video head for playing back the video signal of the second channel recorded in units of one field per one frame on the video track of the VCR tape;

a first audio head for playing back the audio signal of the first channel recorded on a corresponding audio track of the VCR tape; and a second audio head for playing back the audio signal of the second channel recorded on a corresponding audio track of the VCR tape.

13. A playback system for a VCR, as set forth in claim 9, wherein said field compensating means includes:
delay means for delaying an output signal from said video signal processing means by one field; and adding means for adding an output signal from said delay means to an output signal from said video signal processing means.

14. A playback system for a VCR comprising:
playback means for playing back video signals of first and second channels recorded, respectively, in a unit of one field per one frame, on a video track of a VCR tape and for playing back audio signals of the first and second channels recorded, respectively, on audio tracks of the VCR tape, respectively;

video signal processing means for processing one of the video signals of the first and second channels outputted from said playback means to be displayable;

audio signal processing means for processing one of the audio signals of the first and second channels outputted from said playback means to be audible;

field compensating means, responsive to a video output signal from said video processing means, for compensating for an omitted field of the video signal;

first switching means for selectively applying the video signals of the first and second channels outputted from said playback means to said video signal processing means in response to a first switching signal;

second switching means for selectively applying the audio signals of the first and second channels outputted from said playback means to said audio signal processing means in response to a second switching signal;

third switching means for applying the output signal from said video signal processing means to said field compensating means in response to a third switching signal;

fourth switching means for transferring an output signal from said third switching means to an output terminal in response to a fourth switching signal; and switching signal generating means for providing the switching signal for said first to fourth switching means, respectively, to allow the audio and video signals of the first and second channels recorded simultaneously on the VCR tape to be played back selectively according to a user's selection.

15. A playback system for a VCR, as set forth in claim 14, wherein said switching signal generating means includes:

playback mode selecting means for outputting a first logic signal of a first level according to the user's selection if the first and second channel signals have been recorded simultaneously on the VCR tape and for outputting a second logic signal of a second level according to the user's selection if one of the first and second channel signals has been recorded on the VCR tape, as the third and fourth switching signals to said third and fourth switching means, respectively;

channel select signal generating means being enabled in response to the logic signal of the first level from playback mode selecting means for outputting a third logic signal of the first level if the first channel is selected by the user and a fourth logic signal of the second level if the second channel is selected by the user;

pulse generating means being enabled in response to the logic signal of the second level from said playback mode selecting means for generating a pulse signal in the unit of one field;

fifth switching means for applying an output signal from said channel select signal generating means as the first switching signal to said first switching means in response to the logic signal of the first level from said playback mode selecting means and for applying an output signal from said pulse generating means as the first switching signal to said first switching means in response to the logic signal of the second level from said playback mode selecting means; and ORing means for ORing the output signal from said playback mode selecting means and an output signal from said fifth switching means and outputting the ORed signal as the second switching signal to said second switching means.

16. A playback system for a VCR comprising:

playback means for playing back video signals of first and second channels recorded, respectively, in a unit of one field per one frame, on a video track of a VCR tape and for playing back audio signals of the first and second channels recorded, respectively, on audio tracks of the VCR tape, respectively;

video signal processing means for processing one of the video signals of the first and second channels outputted from said playback means to be displayable;

audio signal processing means for processing one of the audio signals of the first and second channels outputted from said playback means to be audible; and field compensating means, responsive to a video output signal from said video processing means, for compensating for an omitted field of the video signal;

wherein said field compensating means includes:

first delay means for delaying an output signal from said video signal processing means by one horizontal interval, interpolating means for interpolating, as a function of an output signal from said first delay means, the output signal from said video signal processing means, second delay means for delaying an output signal from said interpolating means by one field, and first adding means for adding an output signal from said second delay means to the output signal from said first delay means.

17. A playback system for a VCR, as set forth in claim 16, wherein said interpolating means includes:

second adding means for adding the output signal from said first delay means to the output signal from said video signal processing means; and amplifying means for amplifying an output signal from said second adding means by a predetermined amplification degree.

18. A playback system for a VCR, as set forth in claim 17, wherein said amplification degree of said amplifying means is 0.5.

19. A recording system for a VCR comprising:

first signal input means for inputting a first channel signal and detecting video and audio signals from the inputted first channel signal;

second signal input means for inputting a second channel signal and detecting video and audio signals from the inputted second channel signal;

video signal processing means for inputting, in turn, the video signals from said first and second signal input means in a unit of one field per one frame and processing the inputted video signals to be recordable;

audio signal processing means for processing the audio signals from said first and second signal input means to be recordable, respectively; and recording means for recording the recordable audio and video signals corresponding to the first and second channel, processed to be recordable in said audio and video signal processing means, on corresponding tracks of a VCR tape, respectively;

first switching means for inputting the video signals of the first and second channels from said first and second signal input means and outputting, in turn, the inputted video signals to said video signal processing means in units of one field per one frame or outputting only one of the inputted video signals of the first and second channels to said video processing means in response to a first switching signal;

second switching means for outputting, in turn, the recordable video signals of the first and second channels outputted from said video signal processing means to said recording means in units of one field per one frame or outputting only one of the recordable video signals of the first and second channels from said video signal processing means to said recording means in response to a second switching signal;

third switching means for outputting the audio signal from said second signal input means to said audio signal processing means in response to a third switching signal;

switching signal generating means for providing the switching signals for said first to third switching means, respectively, to allow the recordable audio and video signals of the first and second channels to be recorded simultaneously or allow only one of the recordable audio signals of the first and second channels and only one of the recordable video signals of the first and second channels to be recorded according to a user's selection;

wherein said switching signal generating means further includes recording mode selecting means for outputting a logic signal of a first level for the simultaneous recording of the two channel signals or a logic signal of a second level for the recording of only one of the two channel signals, as the third switching signal to said third switching means in accordance with said user's selection;

logic signal generating means for generating, in turn, logic signals of first and second levels in a unit of one field and providing the generated logic signals as the second switching signal for said second switching means; and ORing means for ORing an output signal from said recording mode selecting means and an output signal from said logic signal generating means and outputting the ORed signal as the first switching signal to said first switching means.

20. A video recorder for recording plural channels concurrently comprising:

a first decoder for decoding a first channel signal;

a second decoder for decoding a second channel signal;

a video signal processor, responsive to a first and second channel signal, for converting a channel signal into a broadcast signal that can be recorded by a recording head;

switching signal generating means, responsive to the first and second decoders, for selectively controlling which of the first and second channel signals is input to the video signal processor; and a recording head unit, responsive to the broadcast signal from the video signal processor, for recording the broadcast signal including a first and second recording head;

the switching signal generating means selectively controlling which of the first and second recording heads, respectively, receives the broadcast signal such that the first head records one of two fields corresponding to the first channel signal and the second head records one of two fields corresponding to the second channel signal, to form an interleaved video signal, each frame of the interleaved video signal having a field corresponding to each of the first and second channel signals, respectively, an interleaved video signal being present only as recorded on the VCR tape.

21. A video tape playback apparatus for decoding an interleaved video signal, each frame of the interleaved video signal having a field from each of a first and second distinct video signal, respectively, comprising:

a playback head unit for reading the interleaved video signal;

splitting means, responsive to the playback head unit, for splitting the interleaved signal into a first alpha signal and a second alpha signal;

wherein each respective alpha signal is missing either a first or second field of each frame, respectively; and field compensation means, responsive to either the first or second alpha signals from the splitting means, for compensating each missing field per frame to form a zeta signal;

the zeta signal being sufficient to sustain normal video playback.

22. An apparatus as in claim 21, wherein the field compensation means restores the missing field of the alpha signal as a function of a remaining field to form a beta signal.

23. An apparatus as in claim 22, wherein the field compensation means further comprises:

delay means for delaying the alpha signal by one unit;

wherein the zeta signal is restored as a function of the delayed alpha signal.

24. An apparatus as in claim 23, further comprising:

interpolation means, responsive to the delay means, for interpolating an interpolated signal as a function of the delayed alpha signal and the alpha signal;

wherein the zeta signal is a function of the interpolated signal.

25. An apparatus as in claim 24, wherein the interpolated signal is a function of adding the delayed alpha signal and the alpha signal to form a first summed signal.

26. An apparatus as in claim 25, wherein the interpolation means comprises:

an amplifier for amplifying the first summed signal to form a gamma signal.

27. An apparatus as in claim 26, wherein the field compensation means forms the zeta signal as a function of the delayed alpha signal and the gamma signal.

28. An apparatus as in claim 27, wherein the zeta signal is a function of adding the delayed alpha signal and the gamma signal.

\* \* \* \* \*